United States Patent [19]

Weaver

[11] 4,057,152

[45] Nov. 8, 1977

[54] SILO CENTER DISCHARGE APPARATUS

[76] Inventor: Richard L. Weaver, Rte. 4, Myerstown, Pa. 17067

[21] Appl. No.: 641,154

[22] Filed: Dec. 15, 1975

[51] Int. Cl.² ............................................. B65G 65/46
[52] U.S. Cl. .................................. 214/17 DA; 198/538
[58] Field of Search ............... 214/17 R, 17 D, 17 DA, 214/83.26; 222/461, 575; 198/538

[56] References Cited

U.S. PATENT DOCUMENTS

| 2,757,808 | 8/1956 | Mendez | 214/83.26 |
| 2,969,156 | 1/1961 | Miller et al. | 214/17 DA |
| 3,190,468 | 6/1965 | Kocher | 214/17 DA |
| 3,414,142 | 12/1968 | Kolze | 214/17 DA X |

*Primary Examiner*—Robert G. Sheridan
*Attorney, Agent, or Firm*—Paul & Paul

[57] ABSTRACT

A generally central discharge apparatus is provided for the bottom of a silo, providing for ease of access to a bottom discharge chute, from the bottom thereof, whereby the chute is ordinarily connected for delivery of silage into a hopper, and the hopper is connected to the bottom of the chute for ease of detachment and displacement therefrom. The displacement is generally laterally, by moving the hopper on tracks, and preferably occurs after a slight vertical or clearance displacement of the hopper relative to the chute. A lower conveyor may be provided, directly connected to the hopper movement therewith. An alternative form includes a two-part hopper, one of which is connected to the lower conveyor, and the other of which is a reducing hopper.

4 Claims, 5 Drawing Figures

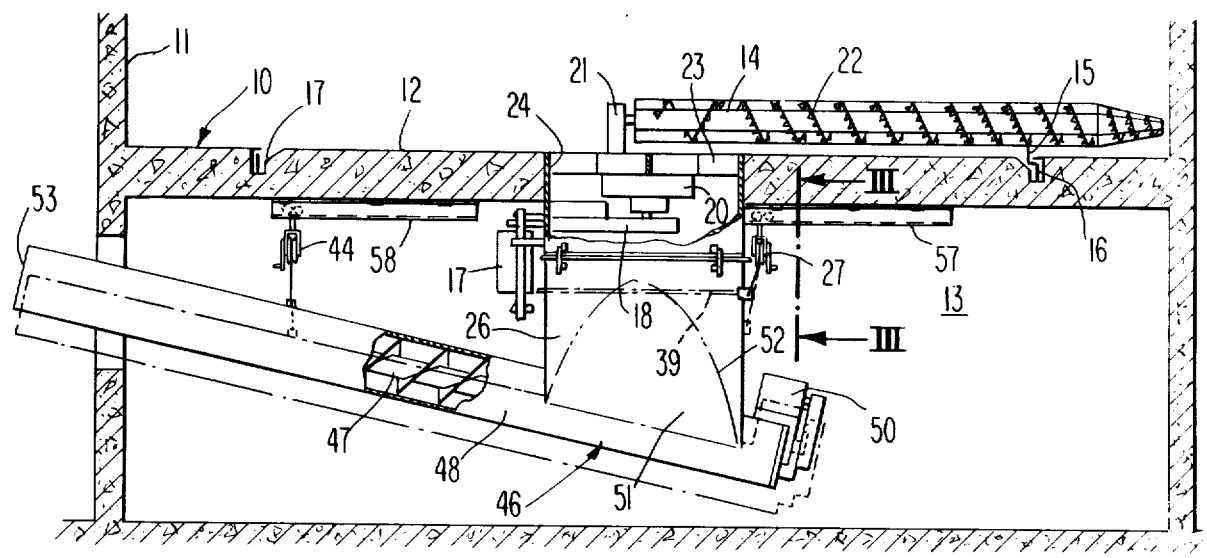
Fig. 1
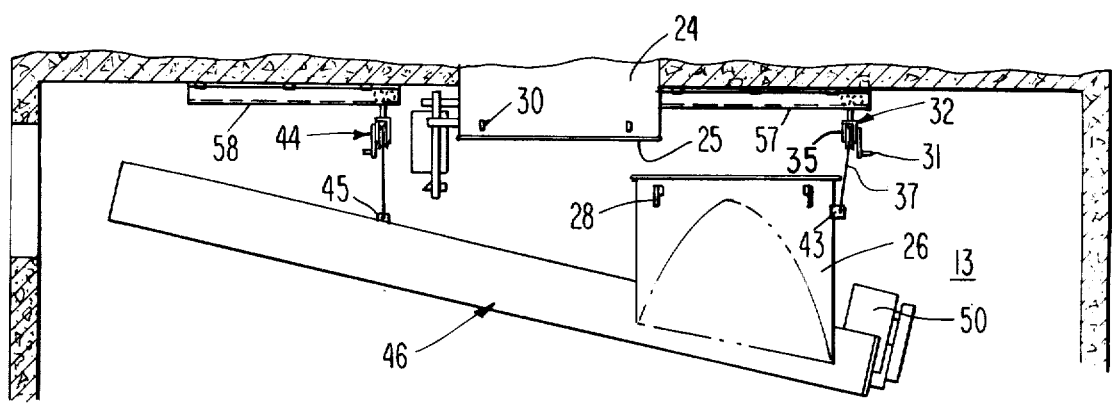
Fig. 2
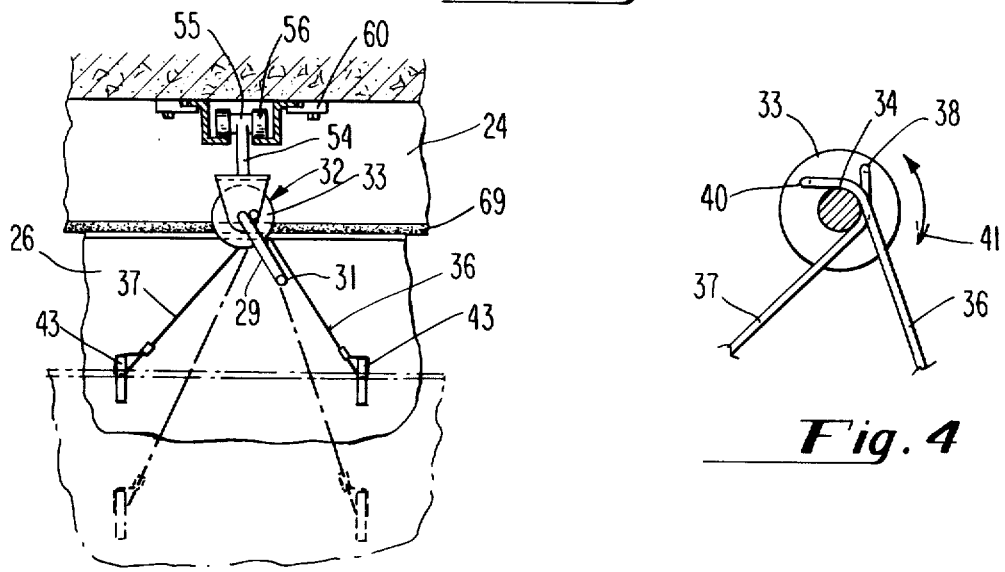
Fig. 3
Fig. 4

SILO CENTER DISCHARGE APPARATUS

BACKGROUND OF THE INVENTION

In some unloaders of prior art types, particularly silo unloaders wherein the silage is discharged through a chute at the approximate geometric center of the silo, into a tunnel beneath the silo, the silage may be dispensed into a hopper for delivery to a lower conveying means, for eventual discharge outside of the silo. Examples of these are present in the following U.S. Pat. Nos.: 3,391,809; 3,237,788.

SUMMARY OF THE INVENTION

The present invention is directed to providing a bottom discharge hopper that is movable away from the chute, for ease of servicing, for facilitating investigation of delivery problems, and the like. In specific form, the hopper is directly connected to the conveyor located therebeneath, for movement of both the lower conveyor and the hopper away from the chute, together as a unit, it further being desirable to provide means for separating the hopper from the chute vertically, for clearance, as well as lateral displacement. Means are provided for readily detaching the hopper from the chute. In another form, the hopper is provided with a reducing portion detachably connected to a reduced portion disposed therebeneath. The reduced portion may also be connected to a lower conveyor, for movement of the reducing portion, reduced portion, and lower conveyor vertically downwardly for clearance, as a unit, if desired, and laterally, for access to the chute.

Accordingly, it is a primary object of this invention to provide access to the bottom of a chute, in a situation in which a silo discharge chute is directly connected to a hopper.

It is a further object of this invention to accomplish the above object, wherein the hopper is displaceable vertically and/or laterally relative to the chute.

It is another object of this invention to accomplish the above objects, wherein a conveyor is connected to the lower end of the hopper for displacement therewith.

It is another object of this invention to provide a reducing hopper that is detachably connected to either or both of a chute disposed thereabove and a reduced hopper disposed therebeneath.

It is another object of this invention to accomplish the above objects, wherein displacement of a reduced hopper and its attached conveyor can be effected, and optionally for displacement of a reducing hopper portion therewith as well.

Other objects and advantages of the present invention will be readily apparent to those skilled in the art from a reading of the brief descriptions of the drawing figures, the detailed descriptions of the preferred embodiments, and the appended claims.

BRIEF DESCRIPTIONS OF THE DRAWING FIGURES

FIG. 1 is a fragmentary vertical sectional view, through a silo in accordance with this invention, wherein the discharge chute, centrally located, is provided, for delivery of silage from an auger within the silo, and wherein the novel hopper arrangements of this invention are illustrated, with the hopper being shown in connected relation to the chute.

FIG. 2 is a fragmentary vertical sectional view of a portion of that which is illustrated in FIG. 1, but wherein the hopper and lower conveyor is illustrated in vertically displaced and laterally displaced disposition.

FIG. 3 is an enlarged side elevational view of the vertical displacement mechanism in accordance with this invention, taken generally along the line III—III of FIG. 1.

FIG. 4 is an enlarged detail view of the winch arrangement for vertical displacement, that is illustrated in FIGS. 1 through 3.

DETAILED DESCRIPTIONS OF THE PREFERRED EMBODIMENTS

Figure 5:
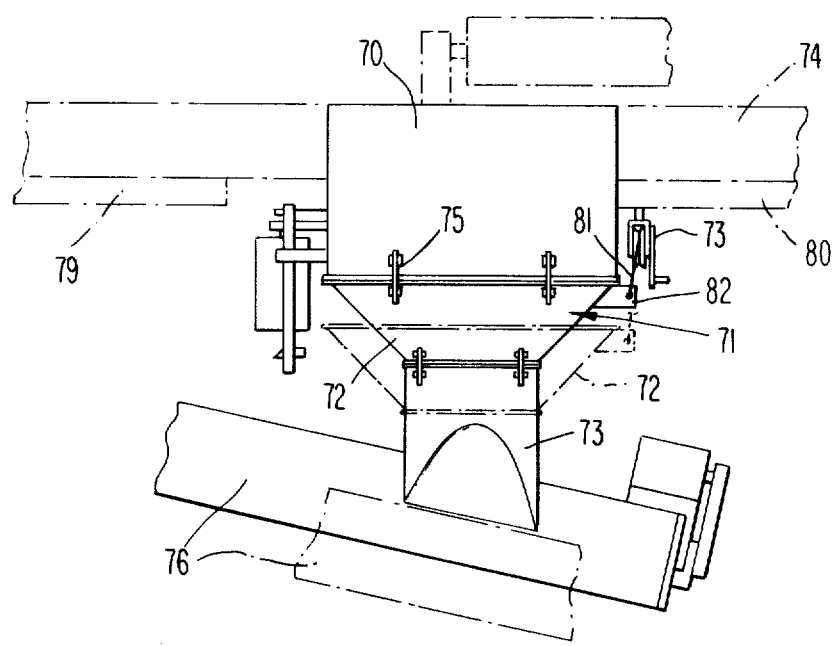
FIG. 5 is a fragmentary vertical elevational view of an alternative form of chute and hopper arrangement.

Referring now to the drawings in detail, reference is first made to FIG. 1, wherein a silo is provided, generally designated by the numeral 10, as being of generally right circular cylindrical construction, preferably concrete, and wherein the silo has cylindrical walls 11, and a floor 12, with a tunnel 13 disposed beneath the floor, and with a radial-type sweeping auger 14 mounted just above the floor 12 of the silo, for movement thereabout by means of a connection 15 carried by a band 16 disposed in a track 17 within the floor. The means for driving the auger 14 across the floor of the silo may be essentially the same as that disclosed in my issued U.S. Pat. Nos. 3,874,524 and 3,817,409, the disclosures of which are herein incorporated by reference.

During the sweeping motion of the auger 14, the auger is also rotated by means of an electric motor 17, operative through a drive chain 18, 20 and 21, such that, as the auger is moved in a stroke-like motion across the floor 12 of the silo, it is also rotated in such a direction that auger fliting 22 delivers silage radially inwardly for delivery into a chute 24, through an upper chute opening 23.

The chute 24 is generally of sheetmetal construction, and is rigidly carried by the floor structure 12, with a chute 24 defining a circular lower opening 25.

A hopper 26 is provided, normally disposed directly beneath the chute 24, as illustrated in FIG. 1, and connected thereto by readily releaseable or detachable connectors 27. A plurality of such detachable connectors 27 are utilized, such as will effect a quick-release disconnection of the hopper 26 relative to the chute 24, with the connectors 27 being of the pivotal clamp type comprising a pivotally mounted bar 28 swingable upwardly from a position therefor illustrated in FIG. 2, to a position therefor illustrated in FIG. 1, wherein, upon pivoting the members 28 upwardly, they are adapted to have a hook-type end (not illustrated) thereof in engagement with upper lugs 30 carried by the outer wall of the chute 24. Generally, four such mechanisms 27 are utilized for attachment.

When it is desired to have access to the chute 24 through its bottom 25, for facilitating the servicing of the drive train 18, 20, 21 or the like to facilitate dislodgement of silage, as for example can happen when the silage is of the type containing hay, that, sometimes can tend to form a dome within the silo requiring breakup, or for any other reason, the hopper 26 may be displaced relative to the chute 24.

Preferably, the displacement will first be effected by means of lowering the hopper 26 relative to the lower end of the chute 24, for facilitating clearance of the upper end of the hopper 26, away from the lower end 25 of the chute 24, to facilitate then lateral displacement of the hopper 26 relative to the chute 24.

The lowering of the hopper 26 is effected by manually engaging a handle 31 of winch 32, for turning a pulley-type winch wheel 33, the shaft 34 of which is carried for rotation in opposite legs of a yoke 35. This will occur after the clamps 27 have been released, and with the handle 31 being turned an amount sufficient to lower the upper end of the hopper 26 from the position illustrated in full lines in FIG. 1, to the lower position therefor illustrated in phantom lines at 36 in FIG. 1. Rotation of the handle 31 and rotation of the wheel 33 effected thereby is adapted for lowering tables 36 and 37 that are connected to the wheel 33 at 38 and 40, respectively, such that the arc of wrap of the cables 36 and 37 around the shaft 34 is reduced as the pulley 33 and attached shaft 34 are rotated in the direction of the phantom-headed arrow 41 of FIG. 4. The opposite ends of the cable 36 and 37 are connected through cable mounts 42 and 43, respectively, as illustrated in FIG. 3. The cable mounts 42 and 43 are carried by and attached by any suitable means to the outside of the hopper 26.

A substantially identical winch construction 44 is provided, connected to cable mounts 45 carried by a lower conveyor 46 disposed in the tunnel 13 beneath the silo 10, as illustrated in FIG. 2, for carrying the weight of the conveyor 46 at the left end thereof as illustrated in FIG. 2.

The lower conveyor 46 will preferably be in the form of an auger 47 disposed within a casing 48, although alternative forms of conveying means may be utilized. The conveyor 46 will generally have its own electrical drive 50 carried thereby, and will be rigidly connected by means of the lower end of the hopper 26 being welded or otherwise suitably secured to the casing 48 of the conveyor 46. Because the casing 48 of the conveyor 46 will ordinarily be of reduced diameter relative to the upper diametral cross-section of the hopper 26, the front 51 and rear (not illustrated) sides of the hopper 26 may converge inwardly in a downward direction, creating a crease line 52 as illustrated in FIGS. 1 and 2. In any event, the hopper 26 will be constructed to permit material discharged thereto, to pass into the interior of the casing 48, for engagement by an auger 47 for delivery of silage outwardly of the silo, through the outer end 53 of the conveyor 46.

The upper ends of the yokes 35 of the winches 32 and 44 are connected by means of rods 54 to trolleys 55, that in turn have rotatable wheels 56 thereon for riding in tracks 57 and 58, for facilitating lateral movement or displacement of the hopper 26, and conveyor 46 mounted for movement therewith. The tracks 57 and 58 may be of the cross-sectional construction illustrated therefor in FIG. 3, being secured to the roof of the tunnel 13 by means of clamping brackets 60 or the like. Each trolley 55 may include four wheels 56, if desired, for spreading the load during rolling movement of the wheels in the tracks.

It will be apparent that, after the desired lowering movement has been effected by cranking of the winches 32 and 44, the hopper 26 and attached conveyor 46 may be moved by manually engaging either of them for movement of the hopper and conveyor as a unit, laterally from the position therefor illustrated in FIG. 1, to that of FIG. 2, for access to the bottom 25 of the chute 24.

In accordance with the present invention, the lateral movement of the hopper 26 and conveyor 46 may be accomplished with very little lateral force.

The winches 33 and 44 may be provided with suitable stops 62 or locking devices (not illustrated) for limiting the amount of vertical downward movement of the hopper 26. The stop 62 may, if desired, take the form of a projection outwardly from a leg of the yoke 35 of an associated said winch 32 or 44, for engagement by a bar 29 of the handle 31, after cranking of the handle 31 in a clockwise direction from its position therefor illustrated in FIG. 3, through an angle of approximately 270 degrees, until it engages the stop post 62 on an opposite side thereof, with reference to FIG. 3.

With reference now to FIG. 5, an alternative form of hopper is illustrated, for connection beneath a chute 70. The chute 70 is essentially the same construction as the chute 24 of FIG. 1, as are other details of the silo and related items.

The hopper 71 of the embodiment of FIG. 5 is of two parts, the upper part 72 being a reducing hopper, and the lower part 73 being a reduced hopper. Winch constructions 73 are provided, connecting the hopper 71 to the tracks 79 and 80 mounted on the lower surface of the silo bottom wall 74.

The reducing hopper portion 72 reduces from a larger circular diameter at its upper end to a lesser circular diameter at its lower end, as illustrated in FIG. 5. The hopper portion 73 is adapted to meet with, and is of the same general opening size as is the outlet size of the lower end of the reducing hopper portion 72, as illustrated in FIG. 5. Readily detachable clamps or connectors 75 are utilized to connect the reducing hopper portion 72 to the chute 70, as well as to the hopper portion 73. The lower conveyor 76 is rigidly mounted to the hopper portion 73 for movement therewith. In all other respects, the arrangement of FIG. 5 is similar to that of FIGS. 2 and 3, with it being understood that a winch similar to that of 73 connects the track 79 to the conveyor 76.

It will be noted that the cables 81 of the winch 73 are connected to cable brackets or mounts 82. While in the embodiment of FIG. 5, the brackets or mounts 82 are illustrated as being carried by the reducing upper portion 72, it will be understood that such may also, if desired, be carried by the reduced hopper portion 73, in the event that it becomes desirable to separate the reduced hopper portion 73 from the reducing hopper portion 72, leaving the reducing hopper portion 72 connected to the chute 70. In some instances, such may be desirable, in order to limit the amount of oxygen access into the silo through the chute 70, while the hopper portion 73 and conveyor 76 are laterally displaced during servicing. In such instance, the lug or mounting portion 82 will be carried by the outer wall of the upper end of the hopper portion 73.

It will be apparent from all of the foregoing the various modifications may be made in the details of construction, as well as in the use and operation of the apparatus in accordance with the present invention, all within the spirit and scope of the appended claims.

What is claimed is:

1. In a silo unloader of the bottom unloader type wherein a rotary auger is utilized to sweep across the floor of a silo to engage silage and wherein the auger rotates on its own axis employing flitting on the auger to convey silage radially inwardly of the silo to a silo discharge opening located generally centrally of the floor of the silo, the improvement comprising a generally centrally located fixedly mounted upper discharge chute and a movable lower discharge hopper disposed beneath said upper discharge chute, and means facilitating lateral displacement of said hopper relative to said chute, including means for lowering said hopper relative to said chute and including means detachably connecting said chute and hopper together, wherein lower means are provided beneath the floor of the silo for conveying silage discharged through the chute and hopper outwardly of the silo, wherein said hopper and said lower means for conveying are connected for lateral displacement and vertical lowering movement together as a unit, wherein track means are provided, connected to any of said hopper and said lower conveying means for facilitating their lateral displacement, and wherein track means comprise a pair of tracks with wheel-like means therein, the tracks being fixedly carried beneath the silo floor and the wheel-like means being movable therein.

2. In a silo unloader of the bottom unloader type wherein a rotary auger is utilized to sweep across the floor of a silo to engage silage and wherein the auger rotates on its own axis employing flitting on the auger to convey silage radially inwardly of the silo to a silo discharge opening located generally centrally of the floor of the silo, the improvement comprising a generally centrally located fixedly mounted upper discharge chute and a movable lower discharge hopper disposed beneath said upper discharge chute, and means facilitating lateral displacement of said hopper relative to said chute, including means for lowering said hopper relative to said chute and including means detachably connecting said chute and hopper together, wherein lower means are provided beneath the floor of the silo for conveying silage discharged through the chute and hopper outwardly of the silo, wherein said hopper and said lower means for conveying are connected for lateral displacement and vertical lowering movement together as a unit, wherein track means are provided, connected to any of said hopper and said lower conveying means for facilitating their lateral displacement, wherein track means comprise a pair of tracks with wheel-like means therein, the tracks being fixedly carried beneath the silo floor and the wheel-like means being movable therein, and wherein said means for lowering comprise cable means operationally connected to said wheel-like means and any of said hopper and lower conveying means.

3. In a silo unloader of the bottom unloader type wherein a rotary auger is utilized to sweep across the floor of a silo to engage silage and wherein the auger rotates on its own axis employing flitting on the auger to convey silage radially inwardly of the silo to a silo discharge opening located generally centrally of the floor of the silo, the improvement comprising a generally centrally located fixedly mounted upper discharge chute and a movable lower discharge hopper disposed beneath said upper discharge chute, and means facilitating lateral displacement of said hopper relative to said chute, including means for lowering said hopper relative to said chute and including means detachably connecting said chute and hopper together, wherein lower means are provided beneath the floor of the silo for conveying silage discharged through the chute and hopper outwardly of the silo, wherein said hopper and said lower means for conveying are connected for lateral displacement and vertical lowering movement together as a unit, wherein track means are provided, connected to any of said hopper and said lower conveying means for facilitating their lateral displacement, wherein track means comprise a pair of tracks with a wheel-like means therein, the tracks being fixedly carried beneath the silo floor and the wheel-like means being movable therein, wherein said means for lowering comprise cable means operationally connected to said wheel-like means and any of said hopper and lower conveying means, and wherein said cable means comprise manually actuable winch means.

4. In a silo unloader of the bottom unloader type wherein a rotary auger is utilized to sweep across the floor of a silo to engage silage and wherein the auger rotates on its own axis employing flitting on the auger to convey silage radially inwardly of the silo to a silo discharge opening located generally centrally of the floor of the silo, the improvement comprising a generally centrally located fixedly mounted upper discharge chute and a movable lower discharge hopper disposed beneath said upper discharge chute, and means facilitating lateral displacement of said hopper relative to said chute, including means for lowering said hopper relative to said chute and including means detachably connecting said chute and hopper together, wherein lower means are provided beneath the floor of the silo for conveying silage discharged through the chute and hopper outwardly of the silo, wherein said hopper and said lower means for conveying are connected for lateral displacement and vertical lowering movement together as a unit, wherein track means are provided, connected to any of said hopper and said lower conveying means for facilitating their lateral displacement, wherein track means comprise a pair of tracks with a wheel-like means therein, the tracks being fixedly carried beneath the silo floor and the wheel-like means being movably therein, wherein said means for lowering comprise cable means operationally connected to said wheel-like means and any of said hopper and lower conveying means, and wherein there are two said track means, one on each side of said chute, and two said cable means, one operationally associated with each said track means.

* * * * *